(12) United States Patent
Zanoni et al.

(10) Patent No.: US 8,837,956 B1
(45) Date of Patent: Sep. 16, 2014

(54) PIPELINED RECEIVER SYSTEM AND METHOD

(75) Inventors: Raymond Zanoni, Columbia, MD (US); Mark A. Willi, Marion, IA (US); Roger A. Dana, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 190 days.

(21) Appl. No.: 13/536,929

(22) Filed: Jun. 28, 2012

(51) Int. Cl.
*H04B 10/00* (2013.01)
*H04B 10/06* (2006.01)

(52) U.S. Cl.
USPC ............ 398/202; 398/158; 398/161; 398/208

(58) Field of Classification Search
CPC ............... H04B 10/613; H04B 10/616; H04B 10/6163; H04B 10/6165; H04B 10/63; H04B 10/697; H04B 10/6971; H04B 10/505
USPC ......... 398/202, 203, 208, 183, 161, 158, 164, 398/204
See application file for complete search history.

(56) References Cited

U.S. PATENT DOCUMENTS

| | | | |
|---|---|---|---|
| 4,384,291 A * | 5/1983 | Lewis et al. ................... | 342/196 |
| 4,694,276 A | 9/1987 | Rastegar | |
| 4,732,447 A | 3/1988 | Wright et al. | |
| 4,928,007 A | 5/1990 | Furstenau et al. | |
| 4,968,986 A | 11/1990 | Wagner | |
| 5,010,346 A | 4/1991 | Hamilton et al. | |
| 5,109,441 A | 4/1992 | Glaab | |
| 5,955,875 A | 9/1999 | Twichell et al. | |
| 6,118,396 A | 9/2000 | Song | |
| 6,188,342 B1 | 2/2001 | Gallo | |
| 6,326,910 B1 | 12/2001 | Hayduk et al. | |
| 6,404,365 B1 | 6/2002 | Heflinger | |
| 6,404,366 B1 | 6/2002 | Clark et al. | |
| 6,420,985 B1 | 7/2002 | Toughlian et al. | |
| 6,459,522 B2 | 10/2002 | Yariv | |
| 6,469,649 B1 | 10/2002 | Helkey et al. | |
| 6,525,682 B2 | 2/2003 | Yap et al. | |
| 6,529,150 B1 | 3/2003 | Shoop et al. | |
| 6,567,436 B1 | 5/2003 | Yao et al. | |
| 6,661,361 B1 | 12/2003 | Lewis et al. | |

(Continued)

FOREIGN PATENT DOCUMENTS

WO  WO-2011/010314  1/2011

OTHER PUBLICATIONS

U.S. Appl. No. 13/204,158, filed Aug. 5, 2011, Zanoni et al.
U.S. Appl. No. 13/240,226, filed Sep. 22, 2011, Zanoni et al.

(Continued)

*Primary Examiner* — Dalzid Singh
(74) *Attorney, Agent, or Firm* — Donna P. Suchy; Daniel M. Barbieri

(57) ABSTRACT

A receiver or spectrum determiner includes stages, Fourier transforms, phase delays and a summer. The stages are coupled are in pipelined fashion along a signal path. Each of the stages has a respective output for providing at least one respective demodulated signal for the stage. The Fourier transforms are for receiving the respective demodulated signal and providing a respective Fourier transform. The phase delays each have a delay associated with the respective stage. Each phase delay is for receiving the respective Fourier transform and providing a respective phase delayed transform in accordance with the respective stage. The summer is for summing the respective phase delayed Fourier transform from each phase delay. The receiver can be an electronic intelligence (ELINT) receiver.

20 Claims, 3 Drawing Sheets

(56) References Cited

U.S. PATENT DOCUMENTS

| | | | |
|---|---|---|---|
| 6,700,517 B1 | 3/2004 | Kellar | |
| 6,714,149 B2 | 3/2004 | Nunnally | |
| 6,771,201 B1 | 8/2004 | Currie | |
| 7,376,349 B2 | 5/2008 | Ionov et al. | |
| 7,471,224 B2 | 12/2008 | Babbitt et al. | |
| 7,564,387 B1 | 7/2009 | Vawter et al. | |
| 7,570,184 B2 | 8/2009 | Ikeda et al. | |
| 7,671,771 B2 | 3/2010 | Hirono et al. | |
| 7,826,752 B1 | 11/2010 | Zanoni et al. | |
| 7,847,715 B2 | 12/2010 | Keith | |
| 7,867,246 B2 | 1/2011 | Kim | |
| 7,868,799 B1 | 1/2011 | Price et al. | |
| 7,876,246 B1 | 1/2011 | Price et al. | |
| 7,956,788 B2 | 6/2011 | Lee et al. | |
| 7,990,299 B2 | 8/2011 | Bell | |
| 8,315,387 B2 | 11/2012 | Kanter et al. | |
| 8,442,402 B1 | 5/2013 | Zanoni et al. | |
| 8,446,305 B1 | 5/2013 | Zanoni et al. | |
| 8,456,336 B1 | 6/2013 | Zanoni et al. | |
| 8,548,331 B1 | 10/2013 | Zanoni et al. | |
| 2007/0159369 A1 | 7/2007 | Currie et al. | |
| 2007/0223936 A1 | 9/2007 | Babbitt et al. | |
| 2010/0002281 A1 | 1/2010 | McDonald | |
| 2011/0002029 A1 | 1/2011 | McDonald | |
| 2012/0087653 A1* | 4/2012 | Sawada et al. | 398/25 |
| 2012/0212360 A1 | 8/2012 | Kanter et al. | |
| 2012/0213531 A1 | 8/2012 | Nazarathy et al. | |
| 2012/0219302 A1* | 8/2012 | Sun et al. | 398/208 |
| 2012/0224184 A1 | 9/2012 | Li et al. | |
| 2012/0299446 A1 | 11/2012 | Shmilovich et al. | |
| 2013/0077962 A1 | 3/2013 | Wu et al. | |
| 2013/0136450 A1* | 5/2013 | Roberts et al. | 398/65 |
| 2014/0005966 A1* | 1/2014 | Fireaizen et al. | 702/79 |

OTHER PUBLICATIONS

Clark et al., Photonics for RF Front Ends, IEEE microwave magazine, May 2011, 9 pages.

Clark et al., Coherent Optical Phase-Modulation Link, IEEE Photonics Technology Letters, Aug. 15, 2007, 3 pages, vol. 19, No. 16.

Valley et al., Photonic analog-to-digital converters: fundamental and practical limits, Integrated Optical Devices, Nanostructures, and Displays, Proceedings of SPIE, 2004, 11 pages, vol. 5618.

Valley, George C., Photonic Analog-to-Digital Converters, A Tutorial, The Aerospace Corporation, 2009, 48 pages.

Valley, George C., Photonic analog-to digital converters, The Aerospace Corporation, Mar. 5, 2007, vol. 15, No. 5, 28 pages.

Zibar et al., Digital Coherent Receiver Employing Photonic Downconversion for Phase Modulated Radio-over-Fibre Links, downloaded on Aug. 2, 2010 from IEEE Xplore, 4 pages.

Zibar et al., Digital Coherent Receiver for Phase-Modulated Radio-Over-Fiber Optical Links, IEEE Photonics Technology Letters, Feb. 1, 2009, 3 pages, vol. 21, No. 3.

Notice of Allowance for U.S. Appl. No. 13/204,158, mail date Jan. 29, 2013, 10 pages.

Notice of Allowance for U.S. Appl. No. 13/240,226, mail date Feb. 14, 2013, 4 pages.

U.S. Appl. No. 13/626,642, filed Sep. 25, 2012, Zanoni et al.

U.S. Appl. No. 13/787,202, filed Mar. 6, 2013, Zanoni et al.

Notice of Allowance for U.S. Appl. No. 13/243,208, mail date Jun. 6, 2013, 11 pages.

* cited by examiner

PIPELINED RECEIVER SYSTEM AND METHOD

CROSS REFERENCE TO RELATED APPLICATIONS

The present application is related to U.S. patent application Ser. No. 13/204,158, filed Aug. 5, 2011 by Zanoni, et al; U.S. patent application Ser. No. 13/240,226, filed Sep. 22, 2011, by Zanoni, et al.; U.S. patent application Ser. No. 12/387,707 filed May 6, 2009, by Price, et al., now U.S. Pat. No. 7,868,799; and U.S. patent application Ser. No. 12/456,932, filed Jun. 24, 2009 by Price, et al., now U.S. Pat. No. 7,876,246, all assigned to the Assignee of the present application and incorporated herein by reference in their entireties.

FIELD OF THE INVENTION

The present specification relates generally to signal processing. More particularly, the present specification is related to signal processing systems and methods.

BACKGROUND OF THE INVENTION

Signal processing techniques are used in a wide variety of applications. Communications frequently use signal processing for modulation/demodulation, analog-to-digital conversion, digital-to-analog conversion, filtering, spectrum analysis, target identification, radar processing, decoding, etc. For example, signal processing is utilized in radio frequency receivers used in military and commercial applications, such as in electronic intelligence (ELINT) receivers, cell phones, wireless local area networks, radars, sensors, etc.

Receivers often compute the spectrum of received signals. Computing the spectrum of wide band signals and very wide band signals can require significant processing power. This requirement is enhanced for systems that use very high frequency RF signals (e.g., 100+MHz and multi-GHz systems). Fundamental performance limits of conventional receiver architectures can significantly constrain the potential of these and other communication systems because of the processing requirement associated with spectrum computations.

Accordingly, there is a need for a receiver architecture for efficiently computing the spectrum of wide band and very wide band signals. Further still, there is a need for a processing pipeline which can handle the performance requirements of spectrum determination using conventional circuit level components with conventional processing power. Yet further, there is a need for a receiver optimized for high speed processing of wide band and very wide band signals. Still further, there is a need for a front end signal processing architecture that can handle high data rates.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

In accordance with one embodiment, an apparatus includes a phase modulator, first switches, second switches, demodulators, first converters, second converters, Fourier transforms, phase shifters and a summer. The phase modulator is configured to receive a first signal and a first pulse signal, and is configured to provide a phase-modulated pulse signal on a signal path. The first switches are coupled in a series relationship Each of the first switches is on the signal path and configured to provide a respective switched phase modulated pulse signal. The second switches are coupled in a series relationship. Each of the second switches is on a reference path and configured to provide a respective switched reference clock signal. The demodulators are each respectively configured to receive a respective switched phase modulate signal and a respective switched reference clock signal. The first converters are respectively configured to receive a respective first demodulator signal and provide a respective first converter signal, and the second converters are respectively configured to receive a respective second demodulator signal and provide a respective second converter signal. Each Fourier transform is configured to receive a respective first and second converter signal and to provide a respective Fourier transform signal. The phase shifters are respectively configured to receive the Fourier transform signals and provide respective phase delays corresponding to the phase relationship along the signal path. The summer is coupled to the phase shifter thereby providing a spectrum of the first signal.

In accordance with another embodiment, a method determines a spectrum of a first signal. The method includes receiving from a plurality of I/Q demodulators respective I and Q demodulated signals associated with the first signal. The respective I and Q demodulated signals are provided from respective stages on a signal path. The method also includes Fourier transforming each of the respective I and Q demodulated signals using a Fourier transform for each stage of the respective stages to provide respective Fourier transforms. The method also includes phase delaying the respective Fourier transforms to provide respective phase delayed transforms in accordance with the respective stages and summing the respective phase delayed Fourier transforms.

In accordance with another embodiment, a receiver includes stages, Fourier transforms, phase delays and a summer. The stages are coupled in pipelined fashion. Each of the stages is for providing at least one respective demodulated signal for the stage. The Fourier transforms are for receiving the respective demodulated signal for each stage and providing a respective Fourier transform for each stage. The phase delays each have a delay associated with the respective stage. Each phase delay is for receiving the respective Fourier transform and providing a respective phase delayed Fourier transform in accordance with the respective stage. The summer is for summing the respective phase delayed Fourier transform from each phase delay.

Another exemplary embodiment relates to an apparatus. The apparatus includes a phase modulator configured to receive a first signal and a first pulse signal and to provide a phase-modulated pulse signal on a signal path. The apparatus also includes a plurality of first switches. Each the first switches are on the signal path and configured to provide a respective switched phase-modulated pulse signal. The apparatus also includes second switches. Each of the second switches are on a reference path and configured to provide a respective switched reference clock signal. The apparatus also includes demodulators, each of which is configured to receive the respective switched phase modulated pulse signal from a respective first switch of the first switches and the respective switched reference clock signal from a respective second switch of the second switches. Each of the modulators is also configured to provide a respective first demodulator signal and a respective second demodulator signal. The apparatus also includes first converters, each of which are configured to receive the respective first demodulator signal from a respective demodulator of the demodulators and provide a respective first converter signal. The apparatus also includes second converters, each of which is configured to receive the respective second demodulator signal from the respective demodulator of the demodulators and provide a respective second converter signal. The apparatus also includes Fourier transforms, each of which is configured to receive a respective first converter signal from a respective first converter of the first converters and a respective second converter signal from a respective second converter of the second converters and to provide a respective Fourier signal. The apparatus also includes phase shifters, each of which is configured to receive the respective Fourier transform signal from a respective Fourier transform of the Fourier transforms and to provide a respective phase delay according to a relationship of a respective phase shifter to the signal path. The apparatus also includes a summer coupled to the phase shifters for providing a spectrum of the first signal.

BRIEF DESCRIPTION OF THE DRAWINGS

The invention will become more fully understood from the following detailed description, taken in conjunction with the accompanying drawings, wherein like reference numerals denote the same or similar elements and in which.

DETAILED DESCRIPTION OF THE PREFERRED EMBODIMENTS

Figure 1:
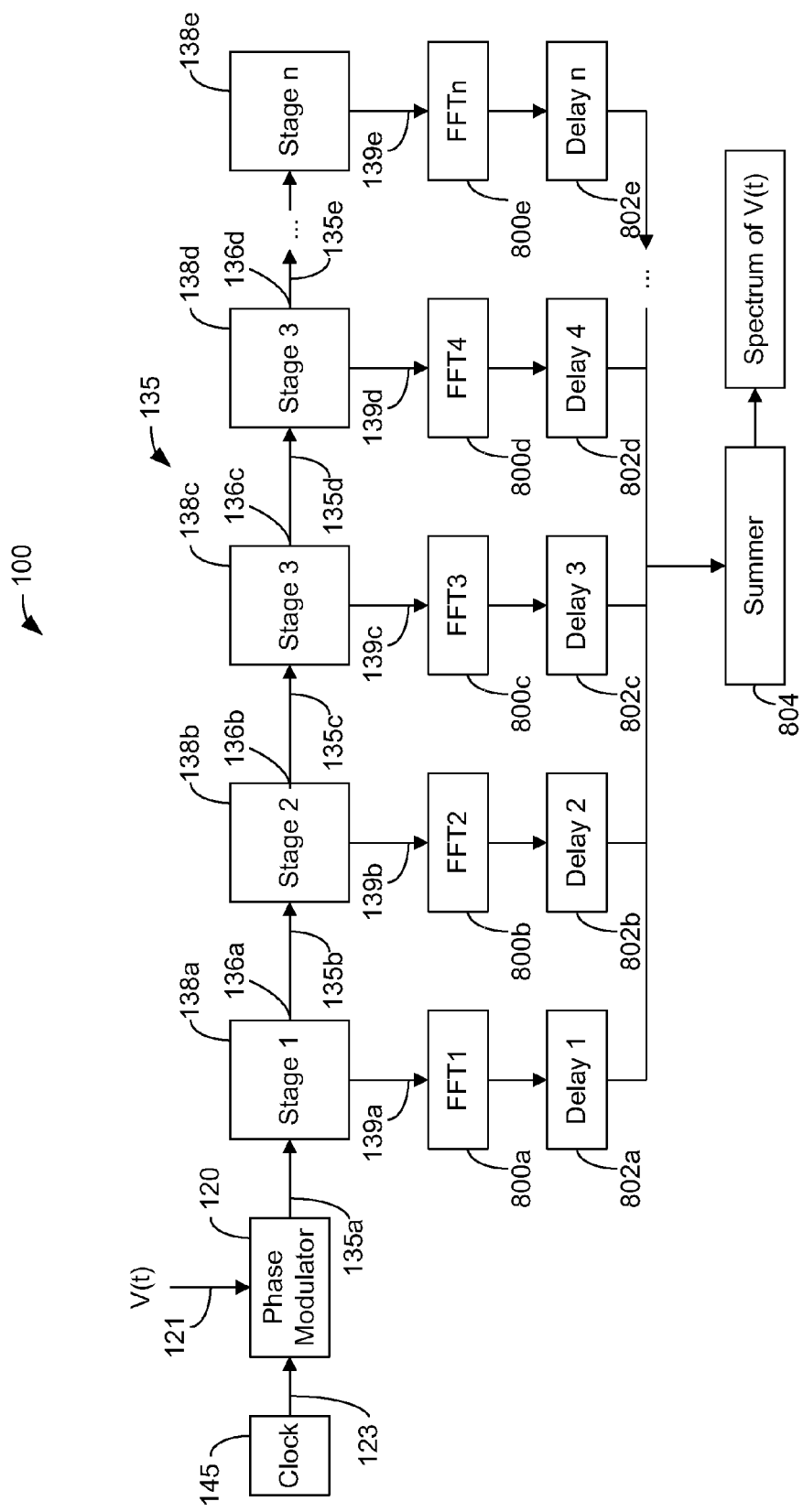
FIG. 1 is a general block diagram of a receiver according to an exemplary embodiment.

Before describing in detail the particular improved system and method, it should be observed that the invention includes, but is not limited to, a novel structural combination of components and not in the particular detailed configurations thereof. Accordingly, the structure, software, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

At least one embodiment relates to a signal processing path for a receiver. The path includes a set of pipelined stages providing signals or data to a set of Fourier transforms in one embodiment. The stages can include electronic and/or optical components, (e.g., analog-to-digital converters and demodulators) in one embodiment. The Fourier transforms provide signals or data in the frequency domain for each respective stage which are phase delayed and summed to detect a spectrum. The receiver can be used for different types of receiving applications, including but not limited to applications associated with radios (e.g., software defined radio, radio receivers capable of wideband or narrowband receiver operations, cell phones, etc.), radars (e.g., a digital radar), and sensors.

With reference to FIG. 1, a receiver 100 can be configured for signal processing in accordance with one embodiment. Receiver 100 can include a phase modulator 120, a clock 145, a set of stages 138*a-e*, a set of Fourier transforms (e.g. Fast Fourier Transforms (FFTs)) 800*a-e*, a set of phase delays 802*a-e*, and a summer 804. The components of receiver 10 in FIG. 1 can be optical or electronic components.

In one embodiment, stages 138*a-e* are coupled in series or in a pipeline configuration. Stages 138*a-e* are shown in FIG. 1 as including four stages however, any number of stages can be utilized from two to N (where N is any number for practical processing). Stages 138*a-e* are disposed according to a relationship with signals provided on a signal path 135 in one embodiment.

Signal path 135 includes a path 135*a* for signals received by stage 138*a*, a path 135*b* for received by stage 138*b*, a path 135*c* for signals received by stage 138*c*, a path 135*d* for signals received by stage 138*d*, and a path 138*e* for signals received by stage 138*e*. Stages 138 *a-d* each include respective outputs 136 *a-d* coupled to its neighboring stage of stages 138*b-e*.

Each of stages 139*a-e* also has respective outputs 139*a-e* which are coupled to respective Fourier transforms 800*a-e*. Transforms 800*a-e* each have outputs coupled to respective phase delays 802*a-e*. Phase delays 802*a-e* have outputs 801*a-e* coupled to summer 804.

Phase modulator 120, receives a clock signal from clock circuit 145 and an input signal from a source at input 21. The signal can be any type of signal and can be represented as V(t). V(t) is a wideband or very wide band signal in one embodiment.

Phase modulator 120 phase modulates the signal at input 121 according to a pulse or clock signal at input 123 from clock 145. The input signal from the source at input 121 can be an RF signal, an optical signal, a sense signal, etc. for processing by receiver 100. Phase modulator 130 provides phase modulated signals along signal path 135.

Switching in stages 138*a-e* provides samples of the input signal to each of stages 138*a-e*. In one embodiment, pulses represent serial samples of the input signal V(t). For example, in receiver 100 with sixteen stages, stage 138*a* would take the first sample, the seventeenth sample and the thirty-third sample of the input signal, and stage 138*c* would take the third sample, ninetieth sample, and thirty-fifth sample of the input signal. Phase modulator 120 and clock 145 control switching so that the appropriate sample is provided to the appropriate stage of stages 138*a-e*.

In one embodiment, stages 138*a-e* provide a digital representation of the input signal V(t) to Fourier transforms 800*a-e*. In one embodiment, transforms 800*a-e* are embodied as a fast Fourier transforms. Delay circuits 802*a-e* provide the appropriate delay associated with the relationship of stages 138*a-e*, and/or transforms 800*a-e* to signal path 138. The delayed transform signals from delays 802*a-e* are provided to summer 804.

Advantageously, receiver 180 combines the outputs (data or signals) of transforms 800*a-e* with the appropriate phase delay via delays 802*a-e* so that summer 804 provides the whole spectrum of the input signal V(t) (as if the entire input signal was processed by one processor in one embodiment). Because each sample size received by each transform 800*a-e* is smaller than the entire signal, Fourier transform calculations can be performed at a lower rate in one embodiment. Summer 804 provides the spectrum of the input signal V(t) in the frequency domain.

Stages 138*a-e*, transforms 800*a-e* and delays 802*a-e* allow receiver 10 to sense a broad spectrum by splitting the front end reception into N stages 138*a-c* and recombining the transform signal associated with each stage 802*a-e* to determine the spectrum in one embodiment. Advantageously in one embodiment, receiver 10 operates as decimator which reduces the rate for digital processing. Delays 802*a-e* ensure that the processed signal derived from V(t) (e.g., transform signals or data) from Fourier transforms 800*a-e* are properly recombined in summer 804. In one embodiment, input signals in 10-GHz range can be divided down by a factor of 10 using the serial-to-parallel processing conversion of receiver 10. In such an embodiment, receiver 10 processes 10 independent bits of information at a 1-GHz rate. Receiver 10 can be configured for sensing a broad spectrum of an RF signal or for processing a high data rate.

Figure 2:
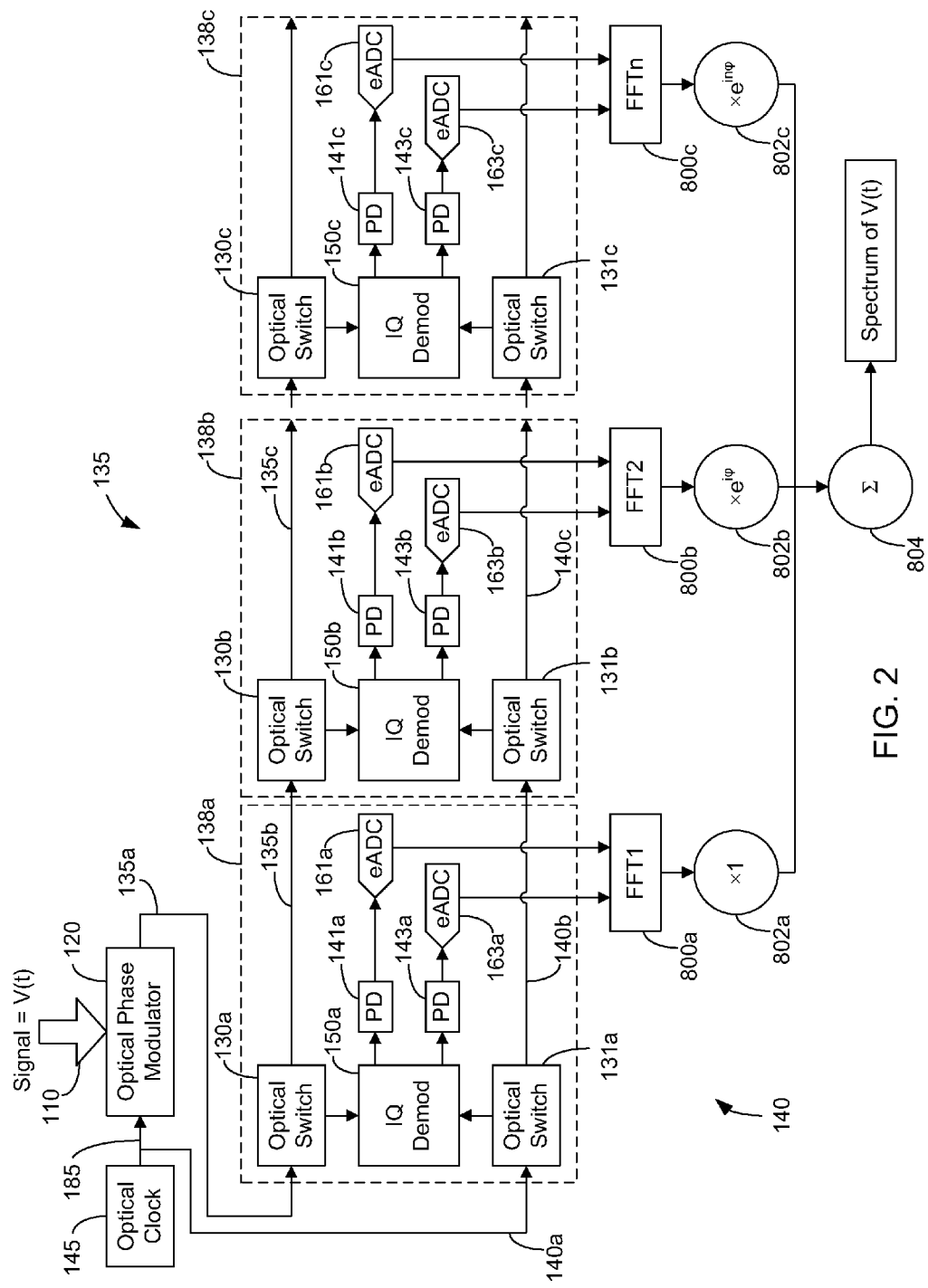
FIG. 2 is a more detailed block diagram of the receiver illustrated in FIG. 1 according to another exemplary embodiment.

With reference to FIG. 2, receiver 100 is advantageously arranged to utilize optical components. Although optical components are utilized in parts of receiver 100, receiver 100 can be a non-optical system (e.g. an all electronic system).

With reference to FIG. 2, phase modulator 120 is an optical phase modulator and receives an input signal or data V(t). Clock 145 is an optical clock circuit providing an optical pulse or clock signal. Phase modulator 120 provides a pulse stream or phase modulated signal on signal path 135 in accordance with the clock signal from clock 145 and the input signal V(t). In one embodiment, phase modulator 120 provides an optical signal on signal path 135. Path 135 is coupled to stages 138*a-c*. Although only three stages 138*a-c* are shown in FIG. 2 for simplicity of explanation, any number of stages 138*a-c* can be utilized without departing from the scope of the invention.

Each stage 138*a-c* includes a respective switch 130*a-c*, switch 131*a-c*, demodulator 150*a-c*, photo detector 141*a-c*, photo detector 143*a-c*, electronic analog to digital converter 161*a-c* and electronic analog-to-digital converter 163*a-c*. In stage 138*a*, switch 130*a* provides the appropriate pulse to demodulator 150*a* and the appropriate remaining pulses to stages 138*b-c* where the pulses are received by respective switches 130*b-c*. For example, the pulses associated with stage 138*a* are provided to demodulator 150*a* and the remaining pulses are provided through switches 138*b-c* to respective demodulators 150*b-c*. In one embodiment, demodulators 150*a-c* are optical I and Q demodulators. However, any type of demodulator can be used. Switches 130*a-c* and 131*a-c* can be optical switches.

Switch 131*a* receives the clock signal from clock 145 (e.g., optical clock) and provides signals on a reference path 140. Reference path 140 is comprised of paths 140*a-c*. Demodulator 150*a* uses the signals from switch 131*a* and 131*b* to provide respective demodulated signals to photo detectors 141*a* and 143*a*. Photo detectors 141*a* and 143*b* provide electronic signals to electronic analog-to-digital converters 161*a* and 163*a*. Electronic analog-to-digital converters 161*a* and 163*a* provide respective electronic demodulated signal to transform 800*a*.

According to a similar architecture, stages 138*b-c* include electronic analog-to-digital converters 161*b-c* and 163*b-c* and photo detectors 141*b-c* and 143*b-c* which provide respective signals to transforms 800 *b-c*. The operation of stages 138*b-c* is similar to the operation of stage 138*a* described above. Although stages 138*a-c* provide two signals to transforms 800*a-c*, a single signal can be provided for each stage 138*a-c*.

Data or signals from transforms 800*a-c* are respectively provided to phase delay circuits 802*a-c*. Transforms 802*a-c* provides a particular frequency band associated with the time domain of the input signal V(t) as provided in stages 138*a-c*. Accordingly, each Fourier transform 800*a-c* requires a smaller chunk of signal for transformation which is then recombined for a final result, thereby requiring less processing power for receiver 100. Phase delays values for phase delays 802*a-c* are selected based upon the relationship of the respective stage 138*a-c* to signal path 130 and to the frequencies which are being reconstructed Receiver 100 can be implemented with various devices including digital signal processing or hardwired circuits. Preferably, each stage 138*a-c* can be provided in hardware as well as the performance of the Fourier transform and delay. Although communication signals are discussed, other types of signals can be processed for The breaking and re-summation of Fourier transforms 80*a-c* is shown below in the following mathematical expressions:

where $0 \leq l \leq N-1$; l is the index of the frequency domain signals; and $S_l$ denotes a frequency bin for respective transform s 800*a-c*

$$S_\ell = \sum_{k=0}^{N-1} x_k e^{-2\pi j k \ell / N}$$

=Full Spectrum of Input Signal $$= \sum_{k=0,m,2m\ldots}^{N-1} x_k e^{-2\pi j k \ell / N} +$$

$$\sum_{k=1,m+1,2m+1\ldots}^{N-1} x_k e^{-2\pi j k \ell / N} + \ldots +$$

$$\sum_{k=m-1,2m-1\ldots}^{N-1} x_k e^{-2\pi j k \ell / N}$$

$$= S_\ell^0 + S_\ell^1 + \ldots + S_\ell^{m-1}$$

Assume that N/m=M=integer, then;

$$S_\ell^0 = \sum_k x_k e^{-2\pi j k \ell / N}$$

$$= \sum_{k'=0}^{[(N-1)/m]} x_{mk'} e^{-2\pi j m k' \ell / N} \quad \text{where } e\, k' = k/m$$

$$= \sum_{k'=0}^{M-1} x_{mk'} e^{-2\pi j m k' \ell / N} \quad 0 \leq \ell \leq M-1$$

which is the Fourier transform of every mth point starting at the first one $$S_\ell^1 = \sum_{k=1,m+1\ldots} x_k e^{-2\pi j k \ell / N} \qquad k' = \frac{k-1}{m}$$

$$= \sum_{k'=0}^{M-1} x_{mk'+1} e^{-2\pi j (mk'+1) \ell / N} \qquad k = mk'+1$$

$$S_\ell^1 = e^{-2\pi j k \ell / N} \sum_{k'=0}^{M-1} x_{mk'+1} e^{-2\pi j k' \ell / M}$$

which is the Fourier transfer of every mth point starting at the 2nd one times the phase factor $e^{-2\pi j k l / N}$ Similarly, $$S_\ell^2 = \sum_{k=2,m+2\ldots} x_k e^{-2\pi jk\ell/N} \qquad k' = \frac{k-2}{m}$$

$$= \sum_{k'=0}^{M-1} x_{mk'+2} e^{-2\pi j(mk'+2)\ell/N} \qquad k = mk'+2$$

which is the Fourier transform of every mth point starting at the second one times the phase factor $e^{-4\pi jk\ell/N}$ $$= e^{-4\pi j\ell/N} \sum_{k'=0}^{M-1} x_{mk'+m-1} e^{-2\pi jk'\ell/M}$$

$$S_\ell^{m-1} = e^{-2\pi j(m-1)\ell/N} \sum_{k'=0}^{M-1} x_{mk'+m-1} e^{-2\pi jk'\ell/M}$$

which is the Fourier transform of every mth point starting at the m-1$^{st}$ one times the phase factor $e^{-2\pi j(m-1)\ell/N}$ Phase modulator 120 can be a phase modulator such as described in U.S. patent application Ser. No. 13/240,226. Clock 145 can be an optical clock as 800 described in U.S. patent application Ser. No. 13/240,226. Demodulators 150a-c can be an a demodulator as described in U.S. patent application Ser. No. 13/240,226. Electronic converters discussed in U.S. patent application Ser. No. 13/240,226 can be utilized as electronic analog-to-digital converters 163a and 163b.

In one embodiment, transforms 800a-c are implemented as Fast Fourier Transforms using parallel processing methods as by Cooley-Tukey (Cooley, James W., and John W. Tukey, "An algorithm for the machine calculation of complex Fourier series," *Math. Comput.* 19, 297-301 (1965)), Marshall Pease (Pease, M. C. (1968). "An adaptation of the fast Fourier transform for parallel processing". *J. ACM* 15 (2): 252-264.) or any of the variants that lead to fast, efficient processing of the Fourier Transform. Summer 804 is implemented as a summing operation implemented in an FPGA (field programmable gate array) in one embodiment. The delays 802a-c are implemented as phase shifts that are implemented in an FPGA in one embodiment. The respective delay of each delay 802a-c corresponds to the phase relationship along signal path 140.

Stages 138a-d can represent separate channels, processed for separate Fourier transforms of the input signal V(t). Each independent FFT from FFT 800a-c are phase shifted and multiplied and then summed to achieve the spectrum of the signal V(t).

Clock 145 supplies a high repetition rate stream of optical pulses with very low clock jitter in one embodiment. Examples of this type of device include the mode locked laser (MLL) and coupled opto-electronic oscillator (COEO).

Input signal 110 can be a radio frequency signal received by a wide band antenna (not shown in FIG. 1), for example. The radio frequency signal can be modulated by a variety of techniques.

Switches 130a-c can be optical or electronic switches connected in a series relationship to each other along a signal path 135. In one embodiment, optical switches 130a-c on the signal path 135 perform optical switching of the phase-modulated optical signal output by the phase modulator 120 in accordance with the series relationship by which the plurality of switches 130a-c on the signal path 135 are connected to each other. In one embodiment, switches 130a-c serve to switch selected pulses to the appropriate demodulator 150a-c and allow the remaining pulses to travel to the next stages 138a-c.

Switches 131a-c can be optical or electronic switches connected in a series relationship along reference path 140. Switches 131a-c on the reference path 140 perform optical switching of a reference optical signal output by clock circuit 145 in accordance with the series relationship by which switches 131a-c are disposed on reference path 140 in one embodiment.

Each of the plurality demodulators 150a-c can perform I/Q demodulation of the received switched outputs from the plurality of switches 130a-c on signal path 135 at timings corresponding to the switched outputs of the plurality of switches 131a-c on the reference path 140 in one embodiment. Each of demodulators 150a-c outputs an I demodulated signal and a Q demodulated signal as a result of the I/Q demodulation that it performs on the optically-switched phase-modulated optical signal.

Each of the pairs of gated photo detectors 141a-c and 143a-c performs photo detection of the respective I demodulated signal and the Q demodulated signal output by the respective I/Q demodulator 150a-c. Photo detectors 141a-c and 143a-c hold the respective I demodulated signal and the Q demodulated signal output by the respective I/Q demodulator of demodulators 150a-c 150 for a clock cycle of the clock signal, and thereby perform a "hold" function of a sample-and-hold circuit in one embodiment. The clock signal at output 185 can be comprised of short optical pulses with a repetition rate satisfying the Nyquist criterion with respect to the RF input signal. Phase modulator 120 accepts this clock signal and imparts to it a phase modulation proportional to the RF input signal and thereby performs a "sample" function of a sample-and-hold circuit in one embodiment.

As shown in FIG. 2, the signal path 135 and the reference path 140 are separate paths that do not directly intersect or directly connect with each other, but whereby both paths provide input signals to the demodulators 150a-c.

Figure 3:
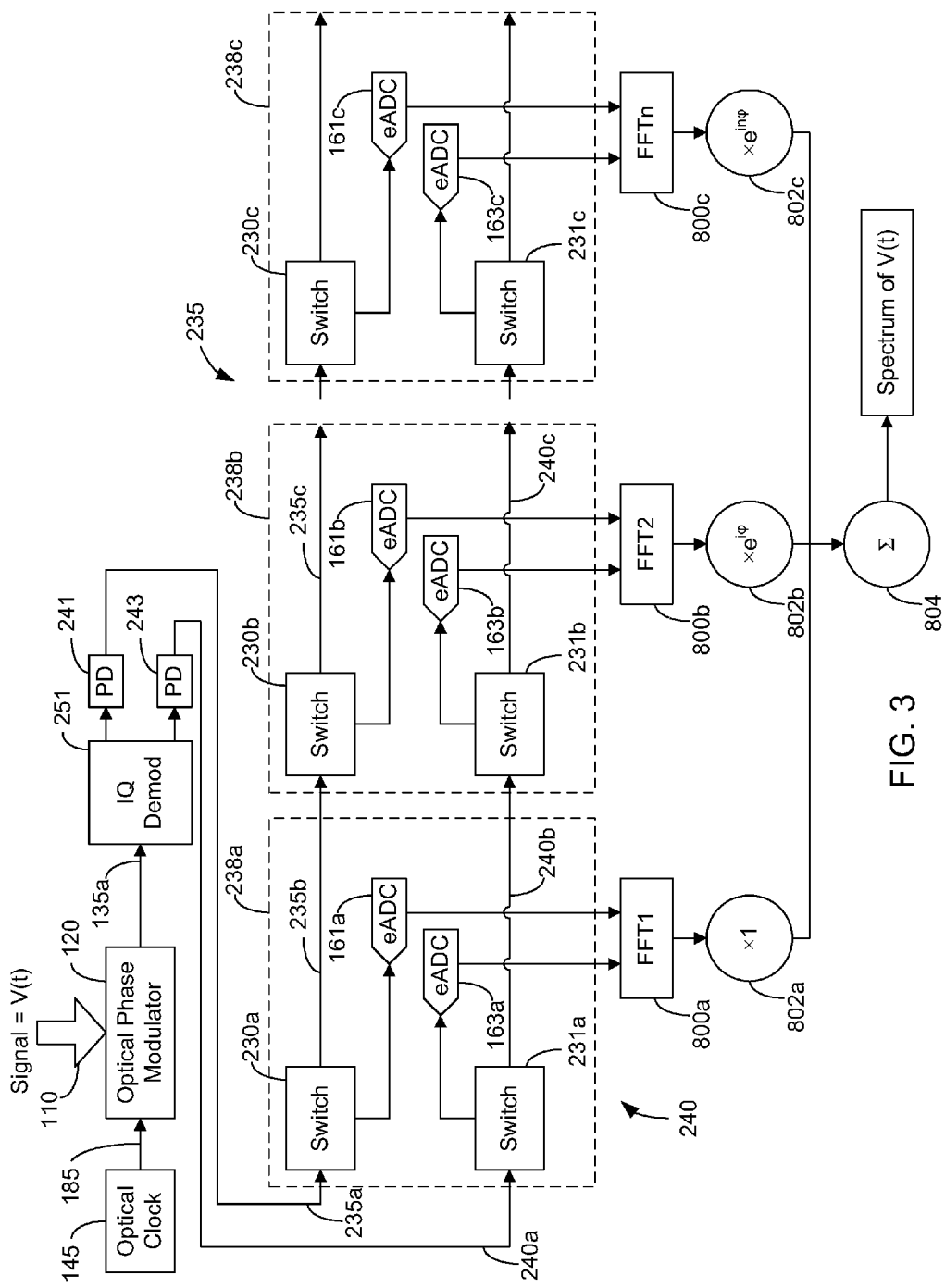
FIG. 3 is a more detailed block diagram of a receiver according to yet another exemplary embodiment.

With reference to FIG. 3., in one embodiment, stages 138a-c do not include modulators 150a-c. Instead, a modulator 251 provides at least one demodulated signal to stages 238a-c. The demodulated signals are converted to electronic signals by optical detectors 241 and 243. The electronic demodulated signals are received by electronic switching circuits 230a-c and electronic switches 231a-c. Stages 138a-c process the electronic demodulated signals on paths 235 and 240. Path 235 includes paths 235a-c, and path 240 includes paths 240a-c. The demodulated signals from each stages 238a-c are transformed by Fourier transforms 802a-c, delayed by delays 802a-c, and summed by summer 804 as discussed above with reference to FIGS. 1 and 2.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Also, while an optical deserialization with gated detectors system and method have been described above with respect to inclusion in a wideband or a narrowband receiver, it can be implemented in other types of high-frequency band receivers, such as receivers operating up to hundreds of GHz. Various changes may be made to the details disclosed without departing from the spirit of the invention which is defined by the following claims.

What is claimed is:

1. An apparatus, comprising:
    a phase modulator configured to receive a first signal, a first pulse signal, and to provide a phase-modulated pulse signal on a signal path;
    a plurality of first switches, each of the plurality of first switches being on the signal path and configured to provide a respective switched phase modulated pulse signal;
    a plurality of second switches, each of the plurality of second switches being on a reference path and configured to provide a respective switched reference clock signal;
    a plurality of demodulators each being configured to receive the respective switched phase modulated pulse signal from a respective first switch of the first switches and the respective switched reference clock signal from a respective second switch of the second switches and provide a respective first demodulator signal and a respective second demodulator signal;
    a plurality of first converters each being configured to receive the respective first demodulator signal from a respective demodulator of the demodulators and provide a respective first converter signal;
    a plurality of second converters each being configured to receive the respective second demodulator signal from the respective demodulator of the demodulators and provide a respective second converter signal;
    a plurality of Fourier transforms, each transform being configured to receive the respective first converter signal from a respective first converter of the first converters and the respective second converter signal from a respective second converter of the second converters and to provide a respective Fourier signal;
    a plurality of phase shifters each being configured to receive the respective Fourier transform signal from a respective Fourier transform of the Fourier transforms and to provide a respective phase delay corresponding a relationship of a phase shifter of the respective phase shifters to the signal path; and
    a summer coupled to the phase shifters for providing a spectrum of the first signal.

2. The apparatus according to claim 1,
    wherein each Fourier transform of the Fourier transforms is connected in series to outputs of each respective pair of converters; and
    a plurality of delivery circuits to the summer connected to the Fourier transforms.

3. The apparatus of claim 2, wherein a plurality of pairs of gated photo detectors hold a respective I demodulated signal and a Q demodulated signal from the demodulators.

4. The apparatus of claim 3, wherein the demodulators and first and second switches are optical components.

5. The apparatus of claim 1, wherein the Fourier transforms are fast Fourier transforms.

6. The apparatus of claim 1, wherein the signal path and the reference path are separate paths that do not directly intersect or directly connect with each other.

7. A method of determining a spectrum of a first signal, the method comprising:
    receiving from a plurality of I/Q demodulators respective I and Q demodulated signals associated with the first signal, the respective I and Q demodulated signals being provided from respective stages on a signal path;
    Fourier transforming each of the respective the I and Q demodulated signals using a Fourier transform for each stage of the respective stages to provide respective Fourier transforms;
    phase delaying the respective Fourier transforms to provide respective phase delayed transforms in accordance with the respective stages; and
    summing the respective phase delayed Fourier transforms.

8. The method according to claim 7, further comprising converting the respective I and Q demodulated signals using a plurality of pairs of gated photo detectors, each performing photo detection of the respective I demodulated signal and the Q demodulated signal.

9. The method according to claim 8, further comprising:
    holding, by the plurality of pairs of gated photo detectors, the respective I demodulated signal and the Q demodulated signal output by the respective I/Q demodulator for a clock cycle of a clock signal.

10. The method according to claim 9, wherein the Fourier transforms are fast Fourier transforms.

11. The method according to claim 7, wherein a phase modulated signal associated with the first signal is provided on the signal path in the respective stages and a pulse signal associated with the phase modulated signal is provided on a reference path, wherein the signal path and the reference path are separate paths that do not directly intersect or directly connect with each other.

12. The method according to claim 7, wherein the respective I and Q demodulated signals are converted by an electronic digital-to-analog converter before the Fourier transforming step.

13. The method of claim 12 wherein the sum of the phased delayed Fourier transforms are used to determine a spectrum of an RF signal.

14. The method according to claim 7 wherein the method is performed in an electronic intelligence receiver.

15. A receiver, comprising:
    a phase modulator configured to receive a first signal, a first pulse signal, and to provide a phase-modulated pulse signal on a signal path;
    a plurality of stages coupled in pipelined fashion, each of the stages for providing at least one respective demodulated signal for the stage, the respective demodulated pulse signal being associated with the phase-modulated pulse signal on the signal path;
    a plurality Fourier transforms for receiving the respective demodulated signal for each stage and providing a respective Fourier transform for each stage;
    a plurality of phase delays each having a delay associated with the respective stage, each phase delay for receiving the respective Fourier transform and providing a respective phase delayed Fourier transform in accordance with the respective stage; and
    a summer for summing the respective phase delayed Fourier transform from each phase delay of the phase delays.

16. The receiver according to claim 15, wherein the respective Fourier transform is a fast Fourier transform.

17. The receiver according to claim 15, wherein the respective Fourier transform is implemented on an ASIC or in a digital signal processor.

18. The receiver according to claim 15, wherein the phase-modulated pulse signal is an optical signal received by an optical switch in each respective stage.

19. The receiver according to claim 15, wherein the respective demodulated signals are respective I and Q signals.

20. The receiver according to claim 15, wherein the receiver is an electronic intelligence receiver.

* * * * *